US012234843B2

(12) United States Patent
Kokot et al.

(10) Patent No.: US 12,234,843 B2
(45) Date of Patent: Feb. 25, 2025

(54) APPARATUS FOR ELECTRONICALLY-CONTROLLED VARIABLE FLOW INLETS AND ELECTRONICALLY-CONTROLLED PNEUMATIC INLET MODULATION OF COMPRESSOR SYSTEMS

(71) Applicant: Vanair Manufacturing, Inc., Michigan City, IN (US)

(72) Inventors: Ralph Kokot, Crown Point, IN (US); Andrew Ward, LaPorte, IN (US); Colin Schroeder, LaPorte, IN (US); Kai Justice, Wheatfield, IN (US); Mark Firnhaber, LaPorte, IN (US)

(73) Assignee: VANAIR MANUFACTURING, INC., Michigan City, IN (US)

( * ) Notice: Subject to any disclaimer, the term of this patent is extended or adjusted under 35 U.S.C. 154(b) by 0 days.

(21) Appl. No.: 18/176,232

(22) Filed: Feb. 28, 2023

(65) Prior Publication Data

US 2023/0272809 A1 Aug. 31, 2023

Related U.S. Application Data

(60) Provisional application No. 63/314,609, filed on Feb. 28, 2022.

(51) Int. Cl.
*F15B 15/20* (2006.01)
*F15B 13/044* (2006.01)

(52) U.S. Cl.
CPC ............ *F15B 15/20* (2013.01); *F15B 13/044* (2013.01); *F15B 2211/426* (2013.01)

(58) Field of Classification Search
CPC ....... F04B 49/225; F04C 29/124; B23K 9/013
See application file for complete search history.

(56) References Cited

U.S. PATENT DOCUMENTS

| | | | | |
|---|---|---|---|---|
| 3,937,915 | A * | 2/1976 | Matsuo | B23K 9/013 219/68 |
| 4,950,863 | A * | 8/1990 | Gilliland | B23K 9/013 219/69.1 |
| 5,533,873 | A * | 7/1996 | Kindl | F04C 18/16 417/295 |
| 9,206,780 | B2 | 12/2015 | Renner | |
| 10,202,968 | B2 * | 2/2019 | Peotter | F04B 35/002 |
| 10,576,573 | B2 | 3/2020 | Fosbinder | |
| 2014/0064992 | A1 * | 3/2014 | Peotter | F04B 35/002 417/279 |
| 2020/0173563 | A1 * | 6/2020 | Mertens | F16K 3/267 |

* cited by examiner

*Primary Examiner* — Thomas E Lazo
(74) *Attorney, Agent, or Firm* — Gary M. Hartman

(57) ABSTRACT

A system and method for controlling flow of air into an air compressor of an air compressor system includes a proportional solenoid valve configured to control flow of supply air into the air compressor in proportional response to sensed air pressure generated by the air compressor system.

17 Claims, 2 Drawing Sheets

APPARATUS FOR ELECTRONICALLY-CONTROLLED VARIABLE FLOW INLETS AND ELECTRONICALLY-CONTROLLED PNEUMATIC INLET MODULATION OF COMPRESSOR SYSTEMS

CROSS-REFERENCE TO RELATED APPLICATIONS

This application claims the benefit of U.S. Provisional Application No. 63/314,609 filed Feb. 28, 2022, the contents of which are incorporated herein by reference.

BACKGROUND OF THE INVENTION

This invention generally relates to air compressor systems and air compressor inlet valves therefor, including but not limited to inlet valves of oil-injected rotary screw air compressors. This invention particularly relates to methods of controlling the quantity of atmospheric air allowed into and out of an air compressor system, control strategies therefor, and devices used in such methods.

Rotary screw compressors are a type of gas compressor commonly used in industrial applications to compress a gas through the action of two meshing spiral rotors. Air is commonly the gas being compressed and as a matter of convenience the following discussion will refer to air, though it should be understood that the discussion is also applicable to other gases. The implementation of rotary screw air compressors for supplying compressed air for pneumatic equipment typically requires the compressor inlet of a rotary screw air compressor to be equipped with an inlet valve for throughput control. Conventionally, this is done with a poppet valve having a linear piston that is forced open by incoming atmospheric air to be compressed by the compressor, and forced closed against a sealing seat to prevent atmospheric air from entering the compressor. Commonly, poppet valves used as compressor inlet valves for air compressor systems are controlled pneumatically. The poppet valve is housed in a compressor inlet housing that typically has an inlet housing control port to a small inlet cavity sealed off to the backside of the poppet valve, with a small bleed orifice to atmosphere either integrated into the compressor inlet housing or an additional outlet port for remote or replaceable bleed orifices. Operation of an inlet poppet valve for an oil-injected rotary screw air compressor typically requires a controllable system pressure signal to the inlet housing control port. The inlet housing control port pressurizes the inlet cavity which acts on the backside of the poppet valve, against the direction of incoming atmospheric air, to partially or fully close off the compressor inlet based on the surrounding valves, apparatuses, sensors, and switches supporting the inlet control strategy. The bleed orifice allows for system air pressure to vent to atmosphere at a controlled rate, and the remaining back pressure in the inlet cavity is the inlet control pressure.

Inlet control strategies for rotary screw air compressors are determined by manufacturers for each application based on system operation and efficiency. Load/unload and mechanical modulation techniques are well known in the compressor industry. However, each one of these methods impose certain limitations in terms of the functionality of the compressor system and how the system user manages the desired output of the system.

Load/unload inlet control methods commonly use an electronic two-position solenoid valve having two ports, a valve inlet and a valve outlet. The valve inlet receives dry full system pressure from a location downstream of all system air and oil coalescing stages and upstream of a minimum pressure valve (MPV) that, once a minimum pressure is met, permits the flow of compressed air to a downstream use load, such as an air-powered tool, machine, etc. The full system pressure is typically not the same as user service line pressure. The solenoid valve outlet is directly mounted or remotely plumbed to (i.e., in fluid communication with) the compressor inlet housing control port. For example, a normally open two-position solenoid valve would allow full compressor operation when the valve is energized to be closed. The two-position solenoid valve receives its electronic signal to de-energize, and thereby opens, by an adjustable pressure switch, fixed pressure switch, pressure sensor, or similar device, when a desired pressure (commonly referred to as the cut-out pressure setting) is met. Opening the two-position solenoid valve allows system pressure to close the compressor inlet poppet valve, thereby preventing any additional airflow into the compressor to be compressed. The compressor system will depressurize due to compressed air consumption by the downstream use load and from the inlet bleed orifice until the compressor system reaches its low-pressure threshold (typically 30 psi below the cutout pressure setting), at which point the adjustable pressure switch or pressure sensor sends a signal to the solenoid valve to energize closed, thereby allowing the compressor inlet to open and build up to cutout pressure again. This cycle will repeat as needed while compressed air is being used. However, this typical load/unload inlet control strategy (also called cut in/cut out strategy) has potential efficiency flaws due to the 30 psi deadband (which as used herein refers to the difference between the cut in pressure and the cut-out pressure) when no external air storage is used.

One inlet control strategy to reduce the deadband and cycling frequency is to use external air storage. This inlet control strategy allows for multiple pressure settings using a single valve. If an adjustable pressure switch is used, it typically requires the use of a pressure gauge and manually turning adjustment screws to set system pressure. If a pressure sensor and electronic controller are used, a desired pressure can be set digitally at the human-machine interface display. However, with this inlet control strategy, system pressure is generally required to build beyond the end user requirement, which requires more power from the compressor drive source.

Mechanical modulation inlet control methods commonly use regulator valves to adjust compressor inlet capacity to match the demand. In rotary screw compressor applications, these regulator valves are used in conjunction with shuttle valves known as blowdown valves. An inlet of the regulator valve receives dry full system pressure from a location downstream of all system air and oil coalescing stages and upstream of the minimum pressure valve. The outlet of the regulator valve is plumbed to the compressor inlet housing control port. The compressor pressure setting is set on the regulator valve with a screw that acts on a regulator spring that works against the regulator valve inlet flow. When system pressure is nearly met, the regulator valve will begin to open and allow a reduced proportional amount of pressure through the regulator valve outlet to partially close the compressor inlet poppet valve. As pressure is met, the proportional control signal to the compressor inlet poppet valve will completely close the compressor inlet. The inlet will continue to open and close as needed to maintain the mechanical pressure set point. With this inlet control strategy, however, the regulator pressure setting often needs to be set about ten to fifteen psi higher than the desired output pressure, which causes input power inefficiency. In applications where multiple system pressure settings are required, it may be cumbersome to set pressure with the adjustment screw and a gauge. While diverter valves and multiple regulator valves can be used to cover a range of preset pressure settings, the tradeoff with this arrangement is cost incurred for additional components.

Compressor unload and blowdown are also slightly different between these two common oil-injected rotary screw compressor inlet control methods. When a compressor is running unloaded, it means that the compressor inlet poppet valve is closed, but the compressor is still running. Compressor system sump blowdown occurs when the compressor system is shut off or disengaged, in which case the compressor inlet poppet valve is closed, the compressor is disengaged (i.e., the compressor is not spinning), and the system is depressurizing to atmosphere. There is commonly a switch, sensor, or timer supporting this blowdown cycle to prevent the compressor from re-engaging until system pressure is low enough to safely re-engage, which is known as a no-load start.

Unload and blowdown are done relatively simply for a load/unload compressor inlet control strategy with a two-position solenoid valve. If the desired pressure is met, based on a pressure switch setting, sensor reading, or similar input, the normally open two-position solenoid valve de-energizes to allow sump pressure to close the inlet valve, running unloaded. If the compressor is shut off, the two-position solenoid valve remains de-energized, and system pressure is steadily vented to atmosphere through the inlet control bleed orifice. A switch, sensor, or timer will not allow the compressor to re-engage until a safe minimum pressure threshold is met to avoid restarting the compressor under load.

Unload and blowdown for mechanical modulation compressor control strategies are not handled via the regulator valve, but rather via the aforementioned blowdown valve, often a pneumatic piloted unloader valve. The blowdown valve typically shares the same inlet source as the regulator valve, but also has a pilot input from a vacuum source in the inlet, which is under vacuum while the compressor is operating. The blowdown valve has a third port which is an outlet to the valve's inlet when the pilot signal becomes pressurized. A compressor with a mechanical regulator for inlet control will run unloaded if the compressor is engaged and the pressure setting is met. When the compressor is disengaged, i.e., shut down, the pilot line from the inlet housing becomes pressurized, the blowdown valve opens, and system pressure vents to atmosphere, typically through an orifice directly mounted to the blowdown valve outlet or redirected to an orifice in the compressor inlet housing.

Unfortunately, each of these types of valving arrangements for opening control pressure to the compressor inlet has one or more limitations that reduce the efficiency or ease of use as described above. It would be desirable to have a system for controlling ingress and egress of air in an air compressor, such as but not limited to oil-injected rotary screw compressors, that overcomes one or more of the limitations with the electronic load/unload control systems and the mechanical regulation systems described above.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, systems, devices, and methods for electronically setting, maintaining, and monitoring intended pressure output(s) of a compressor and/or modulating the compressor inlet based on operator demand.

According to a nonlimiting aspect of the invention, a system for controlling flow of air into an air compressor of an air compressor system includes a proportional solenoid valve configured to control flow of supply air into the air compressor in proportional response to sensed air pressure generated by the air compressor system.

According to another nonlimiting aspect of the invention, a method of controlling flow of supply air into an air compressor of an air compressor system includes sensing an air pressure generated by the air compressor system and controlling an amount of opening of a proportional solenoid valve configured to control flow of supply air into the air compressor in proportional response to the sensed air pressure.

According to another nonlimiting aspect of the invention, a controller is provided that generates an electronic control signal proportionally responsive to a sensed air pressure. The control signal controls a proportional solenoid valve to an open position that is proportional to the sensed air pressure. The controller receives a pressure signal indicative of the magnitude of the sensed air pressure and is configured to generate the electronic control signal for controlling the proportional solenoid valve to open in proportional response to the sensed air pressure. The controller is configured to generate the electronic control signal to be proportional to a difference between a preselected target pressure and the sensed air pressure.

Technical aspects of the systems, methods, and devices as described above preferably include the ability to institute capacity control of a poppet-type compressor inlet valve in oil-injected rotary screw compressor systems, reduce or minimize deadband, reduce power consumption by the compressor drive source, and/or simplify the process for setting a target pressure in comparison with previously known air compressor systems.

These and other aspects, arrangements, and features will become apparent upon review of the attached drawings and the following description.

DETAILED DESCRIPTION OF THE INVENTION

Figure 1:
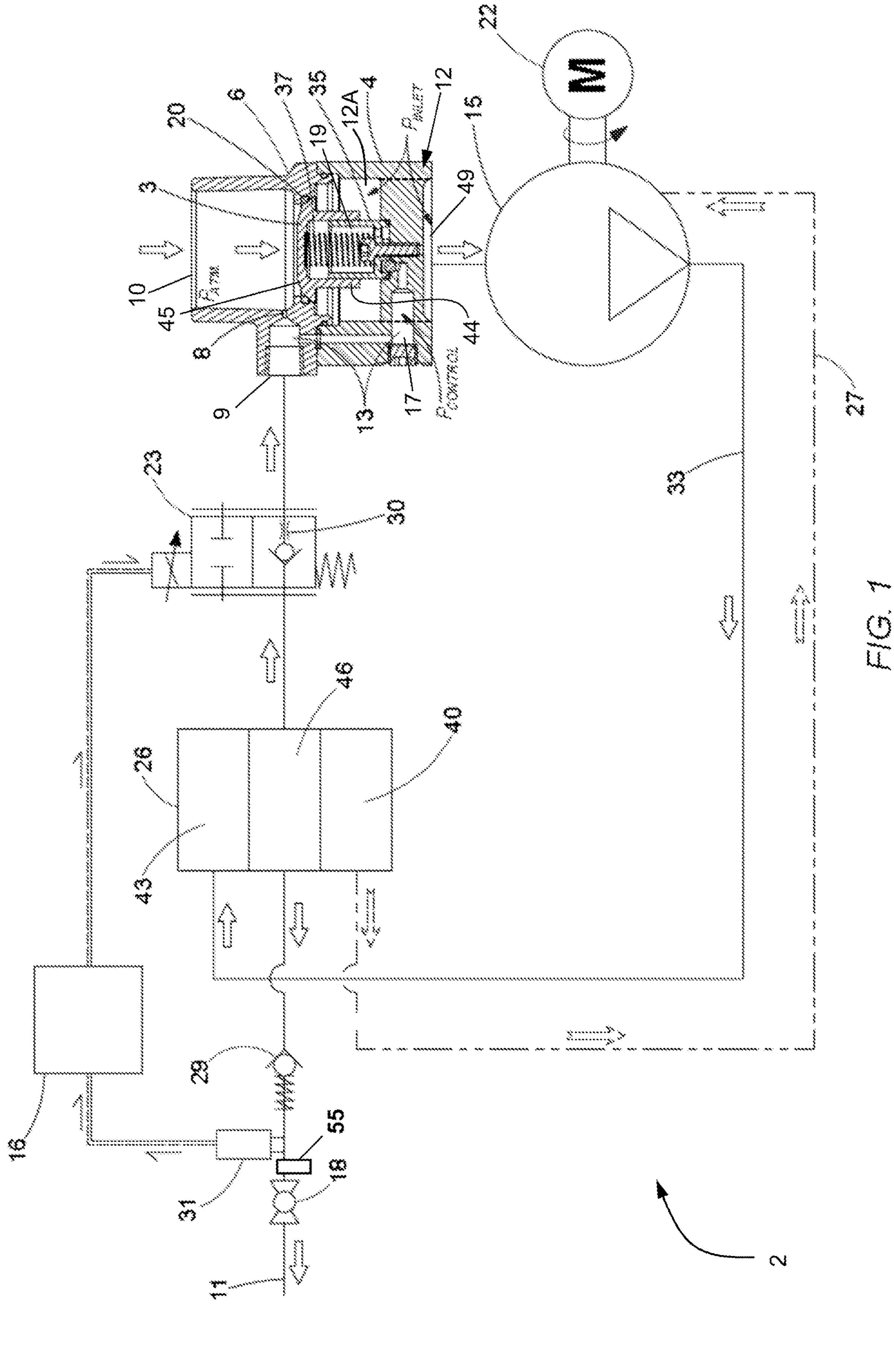
FIG. 1 contains a simplified schematic of an compressor system and a detailed section view of a compressor inlet housing that includes a normally open proportional solenoid valve according to certain nonlimiting aspects of the present invention.

The intended purpose of the following detailed description and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. Therefore, the appended claims, and not the detailed description, are intended to particularly point out subject matter regarded to be aspects of the invention, including certain but not necessarily all of the aspects and alternatives described in the detailed description.

The technology, systems, and methods explained hereinafter are generally applicable, though not exclusively, to mobile utility machines including but not limited to systems and equipment capable of being mounted to or used in combination with various mobile service, municipal, utility, and military vehicles.

According to nonlimiting aspects of the invention, certain advantages can be accomplished by utilizing a purpose-built pulse width modulated proportional solenoid valve having an inlet and an outlet to control a compressor inlet valve of a compressor within a compressor system. Though described herein as an air compressor system, the following is also applicable to systems adapted to compress other gases. The compressor may be an oil-injected rotary screw compressor having a compressor inlet housing containing the compressor inlet valve (for example, a poppet valve as represented in the drawings) for throughput control. A pressure differential pulls the inlet valve open when the compressor is engaged, which as used herein means rotors of the compressor are spinning. The inlet valve can be forced closed using controlled system pressure against the backside of the inlet valve, against the direction of incoming air flow into the inlet valve, to prevent atmospheric air from entering the compressor. An inlet of the pulse width modulated proportional solenoid valve receives a dry full system pressure signal, and the outlet is fluidically connected to an inlet control port on the compressor inlet housing. The inlet control port is fluidically connected to a cavity fluidically connected to the backside of the inlet valve through a closable passage. The inlet control port is also fluidically connected to a bleed orifice that exhausts to atmosphere. A pressure sensor senses service air pressure of compressed air discharged by the air compressor system to one or more downstream use loads intended by an operator, and sends or otherwise provides a pressure signal indicative of the magnitude of the sensed service air pressure to a controller. The controller compares the sensed service air pressure against an electronically set pressure target and generates a control signal proportionally responsive to the pressure signal for the pulse width modulated proportional solenoid valve to respond to. The proportional solenoid valve has multiple partially open positions—up to a theoretically infinite number—between a fully open position and a fully closed position of the proportional solenoid valve. The proportional solenoid valve opens and closes in proportion to the control signal to modulate the compressor inlet valve to maintain constant pressure to match the electronic set point. For example, if the pressure sensor senses a service air pressure that is less than the pressure target, the proportional valve fully or partially closes to cause the compressor inlet valve to open. If the pressure sensor reading is nearing target pressure, at target pressure, or over target pressure, the proportional solenoid valve will fully or partially open to fully or partially close the compressor inlet valve. The result is a usable service air pressure output that is consistent with a desired electronic pressure set point. Key benefits of utilizing an electronic pressure set point include precise maintenance of the set point and resulting efficiency improvements by not overshooting a target pressure to maintain an acceptable system pressure.

Referring now to the drawings, FIG. 1 shows a schematic view of an air compressor system 2 with a detailed section of a compressor inlet housing 6 and a compressor inlet valve 3, which as noted above is represented in the drawings as a poppet valve. The air compressor system 2 includes an air compressor 15, a drive 22 to drive the air compressor 15, the inlet housing 6 that houses the compressor inlet valve 3 coupled to a compressor stator 4 via a poppet guide 35, a pressure sensor 31 configured to sense the pressure of service air produced by the compressor 15 and supplied to a compressed air delivery system (not shown) through a service air outlet 11, a logic controller 16 that receives a voltage signal that directly corresponds with sensed air pressure information from the pressure sensor 31 and generates control signals responsive to the received sensed air pressure information, and a pulse width modulated proportional solenoid valve 23 that receives the control signals from the controller 16 and controls flow of air from an internal system pressure section 46 to an inlet control port 9 of the inlet housing 6. The proportional solenoid valve 23 adjusts to any of multiple positions from fully closed to fully open in response to the control signal, and thus indirectly proportional to the service air pressure sensed by the pressure sensor 31. The inlet housing 6 includes a fixed bleed orifice 8 exhausting from a control pressure section 13 of the inlet housing 6. A service air ball valve 18 separates the air compressor system 2 depicted in FIG. 1 from the service air outlet 11, and therefore from the compressed air delivery system and use load, such as an air powered tool or machine, located farther downstream. The air compressor 15 may include compressor rotors (not shown) and/or other air compression mechanisms disposed inside the compressor stator 4. The system 2 represented in FIG. 1 is particularly well suited for applications in which the air compressor 15 is an oil injected rotary screw compressor; though other types of air compressors may be used. The internal system pressure section 46 may be a portion of an air-oil separation system 26, usually included in the air compressor 15 is an oil injected rotary screw compressor. The controller 16 is preferably an electronic digital controller, for example, including a digital processor including, memory, and programming instructions for controlling the digital processor.

In addition to the inlet control port 9 and control pressure section 13, the compressor inlet housing 6 defines a supply air inlet 10 located on a frontside of the compressor inlet valve 3 and a compressor inlet pressure section 12 located on a backside of the compressor inlet valve 3. The compressor inlet valve 3 opens and closes an air inlet flow channel 12A within the compressor inlet pressure section 12 that extends between the supply air inlet 10 and a compressor air inlet 49 that connects the compressor inlet pressure section 12 to the compressor 15 The control pressure section 13 includes a control pressure channel 17 that fluidically connects the inlet control port 9 to an interior chamber 19 of a supporting cylinder, which serves as the poppet guide 35 that slidably receives a stem 44 of the compressor inlet valve 3 thereon. The compressor inlet valve 3 further comprises a poppet 45 on the stem 44, and the poppet 45 is biased by a poppet return spring 37 to seat against a valve seat 20. Because the stem 44 axially slides along the poppet guide (supporting cylinder) 35, the poppet 45 disengages and engages the valve seat 20 to, respectively, open and close the air inlet flow channel 12A.

The compressor inlet housing 6 and compressor stator 4 may take any arrangement(s) sufficient to accommodate the linear movement of the compressor inlet valve 3, which travels in a preestablished linear path along the poppet guide 35 or as fixed to other styles of piston valve members. The poppet guide 35 may have the form of a cylinder as shown in FIG. 1, forming the interior chamber 19 that is surrounded and covered by the stem 44 located on the backside of the compressor inlet valve 3. The compressor inlet housing 6 and all fundamental features and components, such as the compressor inlet valve 3, may be integrated with an inlet section of the compressor stator 4 or combined as a stand-alone assembly to be mounted to the compressor stator 4. The integrated fixed bleed orifice 8 is disposed in the control pressure section 13 of the inlet housing 6 and is configured to exhaust to atmosphere. The bleed orifice 8 may be plumbed remotely. Though represented as being fixed, the bleed orifice 8 may be adjustable in some manner, such as with a set screw or needle valve.

The compressor inlet valve 3 provides throughput management for the air compressor system 2. As noted previously, the compressor inlet valve 3 in this nonlimiting example is a poppet valve, whose stem 44 slides on the poppet guide 35 in a predetermined linear path along the axis of the poppet guide 35. The poppet guide 35 is described above as having the form of a cylinder but may have another form suitable for guiding travel of the poppet 45 and providing a pathway for control air pressure to the backside of the poppet 45. However, other types and styles of valves may be implemented. When the compressor 15 is in a normal, unpowered, state, the poppet 45 is pressed closed against the valve seat 20, such as a sealing O-ring, by means of the poppet return spring 37. The poppet return spring 37 presses against the backside of the poppet 45 and the interior of a base of the poppet guide 35. Other arrangements of the compressor inlet valve 3 are also possible.

The air compressor 15 is driven by the drive 22, which may be any type of power source suitable for providing the mechanical energy needed to drive the air compressor 15 in a manner sufficient to generate a desired flow of compressed air. Activation of the air compressor system 2 is dependent on the type of the drive 22 and the attendant drive design. Some applicable types of drives that can be used as driving sources include combustion engines (e.g., petroleum gas engines, diesel engines, natural gas engines, and propane engines), electric motors (e.g., AC motors and DC motors), and hydraulic motors. Depending on the drive type and input, the compressor 15 is activated in some capacity by a drive linkage, which may include, as nonlimiting examples, a clutch, a directly coupled drive, or a belt or chain driven by a motor or engine via pullies, gears, or sprockets.

When the air compressor 15 is activated (e.g., the rotors of a rotary screw compressor are spinning), the poppet 45 in the inlet housing 6 is pulled off its valve seat 20 by compressor intake vacuum caused by the volumetric flow generated by the rotors spinning, and the mass flow of air (or another gas) entering through the supply air inlet 10. The supply air inlet 10 may be open to atmosphere to provide a supply of air at atmospheric pressure or may be connected to another supply of air or other gases. Typically, the air compressor 15 will have an intake filter (not shown) either mounted directly to some arrangement of the inlet housing 6 or remotely mounted with a vacuum-rated hose or tube connected to the inlet housing 6. Air drawn into the compressor inlet housing 6 by the air compressor 15 enters through the supply air inlet 10, flows through the open compressor inlet valve 3 and through the air inlet flow channel 12A, and then enters the air compressor 15 where the air is compressed and pressurized. If the air compressor 15 is an oil-injected rotary screw air compressor, the air may be mixed with oil injected from an oil supply line 27 from an oil sump 40 of the air-oil separation system 26. A resulting pressurized wet discharge stream 33 from the air compressor 15 is a mixture of compressed air and oil. The wet discharge stream 33 enters the air-oil separation system 26, which is schematically represented in FIG. 1 as a generalized air and oil receiver tank and separation system that typically includes a pressure vessel and surrounding system that is configured to separate the air and oil in the wet discharge stream 33 received from the air compressor 15. In this example, the air-oil separation system 26 can be considered as having three simplified sections: a wet air section 43 for receiving the compressed air and oil mixture of the wet discharge stream 33, the internal system pressure section 46 for delivering dry system air to the service air outlet 11, and the oil sump 40 for collecting system oil separated out from the wet discharge stream 33 by any suitable oil separation method, as nonlimiting examples, changes in velocity, changes in direction, gravity, and/or coalescing filter elements. Dry system air from the internal system pressure section 46 can be used for both service air delivered to the service air outlet 11 and for pneumatic control of the compressor inlet valve 3.

The service air delivered to the service air outlet 11 is a dry compressed air that may be used to operate downstream use loads, as nonlimiting examples, pneumatic equipment such as impact wrenches, die grinders, angle grinders, air files, reciprocating saws, needle scalers, air sanders, and the like. A minimum pressure valve (MPV) 29 is depicted as separating the service air outlet 11 from the air compressor system 2. A first function of the minimum pressure valve 29 is to prevent flow of pressurized air to the service air outlet 11 until a preselected minimum system pressure is met. This function ensures that ample system pressure is maintained for compressor oil circulation and other pneumatic control functions while the compressor 15 is operating. Another function of the minimum pressure valve 29 is to act as a check valve to prevent back flow of service air from a downstream use load into the compressor system 2.

A method for maintaining system air pressure in the internal system pressure section 46 during operation of the compressor 15 is with pneumatic control over the compressor inlet valve 3, which ultimately manages system throughput. In order to do this, the internal system pressure section 46 is operatively coupled with the inlet control port 9 of the inlet housing 6 so that system pressure from the internal system pressure section 46 can be used to control the operation of the compressor inlet valve 3. In the arrangement shown in FIG. 1, this control is accomplished with the pulse width modulated proportional solenoid valve 23 configured to control the position of the compressor inlet valve 3 during operation of the air compressor 15. The proportional solenoid valve 23 is a normally open valve, shown here in its normally open position. The proportional solenoid valve 23 is schematically represented in FIG. 1 as including a valve member, such as a shuttle, piston, or flap, that can shift between a plurality of valve positions, including a fully open position, a full closed position, and one or more partial open positions (up to an infinite number) between the fully open and fully closed positions. The proportional solenoid valve 23 is also represented as including a solenoid that controls the position of the valve member at any of its valve positions. The solenoid of the proportional solenoid valve 23 is controlled by electronic control signals generated by the controller 16 so as to selectively position the valve member in any selected one of the possible valve positions. This compressor control scenario requires valve energization to load the compressor system 2. When the proportional solenoid valve 23 is fully energized closed, system pressure in the internal system pressure section 46 will deadhead against the inlet of the proportional solenoid valve 23, resulting in the proportional solenoid valve 23 being completely closed and thereby preventing movement of pressurized air from the internal system pressure section 46 to the inlet control port 9. This allows the compressor inlet valve 3 to open as a result of the poppet 45 being pulled off its valve seat 20 by compressor intake vacuum created by the spinning compressor rotors, and remain open to allow atmospheric air to enter the air compressor 15. This control method using a normally open proportional solenoid valve basic logic energizes the valve 23 to load the compressor 15.

The proportional solenoid valve 23 can be partially opened in a theoretically infinite number of positions between the fully open position and the fully closed position in response to the control signal received from the controller 16. As the proportional solenoid valve 23 is partially opened, some flow of system pressure air from the internal system pressure section 46 is allowed to pass through the proportional solenoid valve 23 to the inlet control port 9 and subsequently into the control pressure section 13. System pressure air passing through the proportional solenoid valve 23 passes through an internal flow orifice 30 of the proportional solenoid valve 23, which causes a pressure drop on the outlet side of the proportional solenoid valve 23. The control pressure section 13 fluidly connects the inlet control port 9 with the backside of the poppet 45 via the interior chamber 19 of the poppet guide 35. A passageway through the base of the poppet guide 35 couples the control pressure channel 17 with the interior chamber 19 of the poppet guide 35. The poppet 45 closes the opposite end of the interior chamber 19, such that control pressure from the control pressure section 13 is fluidly connected with the backside of the poppet 45. The reduced pressure from the outlet of the proportional solenoid valve 23 permeates the control pressure section 13 of the compressor inlet housing 6 and is simultaneously vented to atmosphere through the bleed orifice 8 while some back pressure remains to press against the backside of the poppet 45 and thereby partially or fully close the compressor inlet valve 3, depending on the volume of air allowed through the proportional solenoid valve 23. The more air allowed to pass through the proportional solenoid valve 23, the higher the pressure against the backside of the poppet 45, and thus the more closed the compressor inlet valve 3 is maintained.

The forces acting on the poppet 45 during the operation of the compressor 15 are atmospheric pressure on the frontside of the poppet 45 from the supply air inlet 10, pressure or vacuum within the air inlet flow channel 12A, and the spring force of the poppet return spring 37 against the backside of the poppet 45. The control pressure from the proportional control valve 23 can be controlled so as to balance the net sum of these three forces to hold the poppet 45 in some middle position between fully open and fully closed, thereby creating a reduced flow scenario. In addition, the control pressure from the proportional control valve 23 can be controlled so as to overcome the net sum of these forces to seal the poppet 45 against the valve seat 20, thereby completely closing the compressor inlet valve 3. The percentage that the proportional inlet valve 23 is open or closed is an indirect response to the service air pressure sensed by the pressure sensor 31.

The pressure sensor 31 senses actual service air pressure, such as immediately downstream of the minimum pressure valve 29. The pressure sensor 31 generates a sensed pressure signal that has a value directly correlated with the magnitude of the sensed service air pressure. The pressure sensor 31 may be any type of pressure sensor that is capable of generating a sensed pressure signal that is indicative of the service air pressure for use at the controller 16.

As noted above, the controller 16 generates electronic control signals for controlling the position of the proportional solenoid valve 23 in response to the sensed pressure signal from the pressure sensor 31. In one configuration, the controller 16 stores a target pressure setpoint. The target pressure setpoint can be selected and/or edited by a system operator through any suitable data entry mechanism, such as a keypad and/or graphic user interface, and stored, for example, in a digital memory.

In one arrangement, the pressure sensor 31 measures the actual service air pressure in the line between the minimum pressure valve 29 and service air ball valve 18 and outputs a voltage signal which directly correlates with the sensed service air pressure. The voltage signal is received by the controller 16, which generates a control signal, such as an output current, to the proportional solenoid valve 23 in response to any difference between the target pressure value and the sensed service air pressure. Preferably, the control signal varies proportionally to the magnitude of the difference between the target pressure value and the sensed service air pressure. For example, in the case of the normally open proportional solenoid valve 23, if the sensed service air pressure is below the target pressure set point, the proportional valve 23 will fully or partially close to allow the compressor inlet valve 3 to fully or partially open, depending on how close the sensed service air pressure is to the target pressure set point. In one arrangement, the controller 16 has programmatically adjustable variable ramp up and ramp down logic functions depending on the measured difference between the sensed service air pressure measured by the pressure sensor 31 and the preselected target pressure set point. A benefit of the control method described using a proportional solenoid valve 23 is that it is not dependent on knowing or maintaining an exact or actual position of the poppet 45. Rather, the control method is responsive to the actual service air pressure being supplied to the end user. In this way, the variable control of the position of the valve member of the proportional solenoid valve 23 causes the compressor inlet valve 3 to open or close in proportion to the service air pressure downstream from the minimum pressure valve 29.

In the arrangement of FIG. 1, the normally open proportional solenoid valve 23 is also responsible for both unloading the compressor system 2 and blowing down the compressor system 2. When unloading the compressor system 2, the compressor inlet valve 3 is held closed via control pressure from the proportional solenoid valve 23 while the air compressor 15 is still engaged, for example, the rotors are still spinning, which prevents atmospheric air from entering the compressor system 2. During unloading, system pressure will begin to drop at a rate determined by the amount of control back pressure provided via the proportional solenoid valve 23 and the size of the bleed orifice 8 to atmosphere. An unloaded state is achieved when the service air discharge pressure target is met and is not dropping, which signifies that there is no operator demand for compressor output. The reduction of system pressure within the air compressor system 2 effectively reduces the load that the compressor rotors are working against, which reduces the load required from the drive 22 to drive the air compressor 15.

System blowdown occurs when the air compressor 15 is disengaged, for example, either when the drive 22 is stopped or when the compressor 15 is decoupled via a clutch or some other capacity of drive coupling. System blowdown is complete when all excess pressure within the air compressor system 2 upstream of the minimum pressure valve 29 is vented to atmosphere. For example, all system pressure may be vented through the fixed bleed orifice 8 in the control pressure section 13 of the compressor inlet housing 6. During a blowdown cycle, the poppet 45 is held closed against the valve seat 20 by the control pressure that is also venting through the control pressure section 13 and the bleed orifice 8 to atmosphere. This prevents any system oil present in the compressor stator 4 from flooding or overflowing the compressor air inlet 49 and passing through the compressor inlet valve 3, which could otherwise be caused by backflow of pressurized air in the air compressor 15 during pressure normalizing with system pressure when the compressor rotors are stopped.

Preferably, reengagement of the compressor system 2 is inhibited or prevented during compressor system blowdown, for example, by a control routine implemented by the controller 16 or other switching mechanism, until a low-pressure threshold is met. This may prevent mechanical shock, and in some cases failure, which could otherwise be induced by engaging the compressor 15 with an existing pressure load present within the air compressor system 2.

Figure 2:
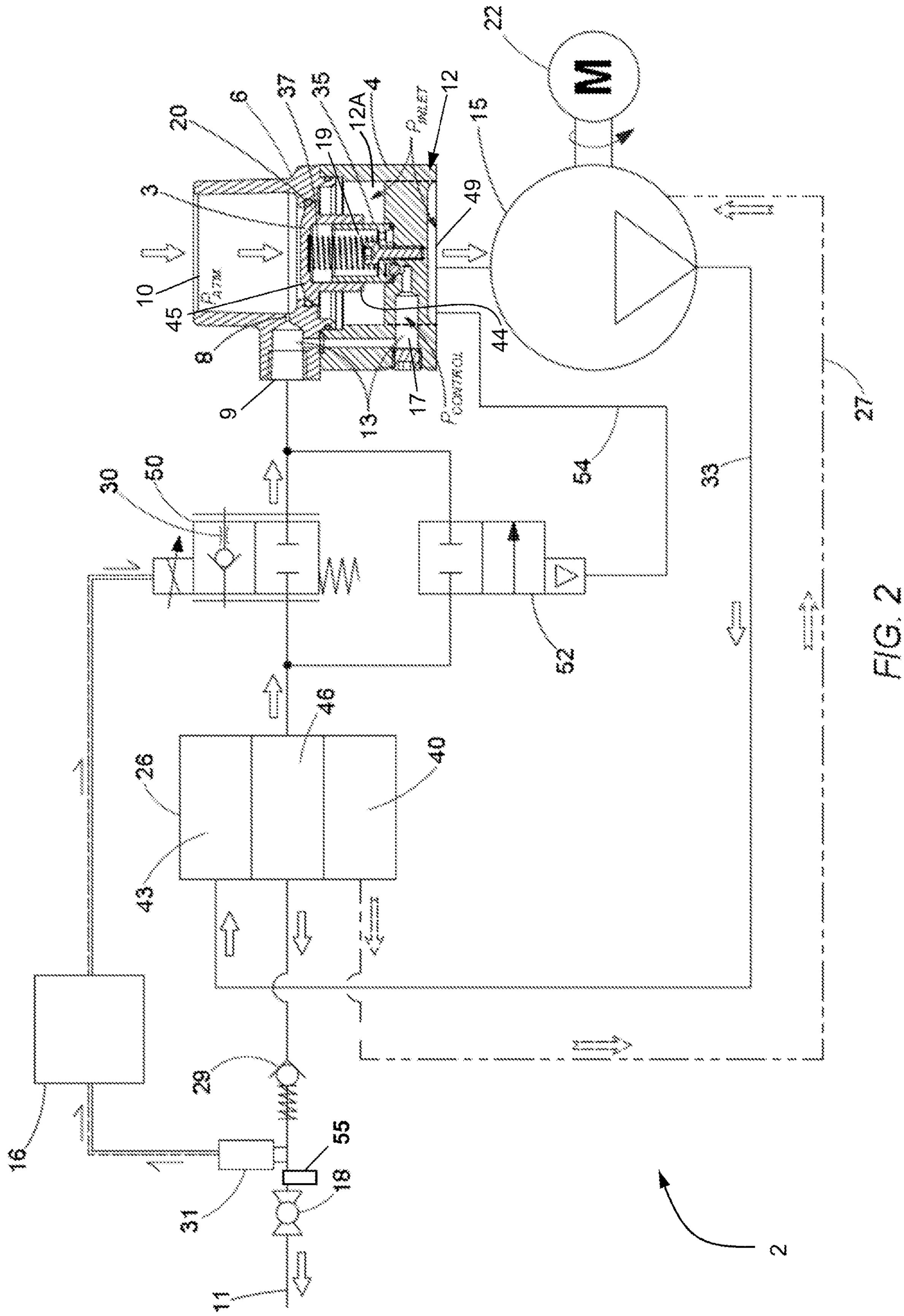
FIG. 2 contains a simplified schematic of an compressor system and a detailed section view of a compressor inlet housing that includes a normally closed proportional solenoid valve according to certain nonlimiting aspects of the present invention.

Turning now to the arrangement shown in FIG. 2, another air compressor system 2 is shown that includes components of the air compressor system 2 of FIG. 1, with the difference being the use of a normally closed proportional solenoid valve 50 for compressor pneumatic inlet control between the internal system pressure section 46 and the inlet control port 9 (instead of the normally open proportional solenoid valve 23 of FIG. 1) and a separate blowdown valve 52. Reference characters for similarly functioning components are carried over from FIG. 1 to FIG. 2, and reference is made to the previous description of these components without repeating such description here. Different and additional components have been given unique reference characters.

As before, the proportional solenoid valve 50 pneumatically controls the position of the compressor inlet valve 3 during compressor operation. However, in this arrangement the normally closed proportional solenoid valve 50 must be energized to unload the compressor system 2. In the non-energized normally closed state of the proportional solenoid valve 50, and during compressor operation, system pressure from the internal system pressure section 46 deadheads against the inlet of the proportional solenoid valve 50, and the poppet 45 translates under the influence of compressor intake vacuum to its open position and remains open to allow atmospheric air to enter the air compressor 15 from the supply air inlet 10. When the proportional solenoid valve 50 is fully or partially energized, the solenoid valve 50 fully or partially opens in proportion to the extent it is energized. This allows system pressure from the internal system pressure section 46 to pass through the solenoid valve 50 and into the inlet control port 9 and the control pressure section 13 to provide control pressure for the compressor inlet valve 3, thereby partially or fully closing the poppet 45 against the valve seat 20 in the opposite direction of incoming atmospheric air from the supply air inlet 10.

Similarly, as with the normally open proportional solenoid valve 23 of FIG. 1, the percentage, i.e., proportion between fully open and fully closed, that the proportional solenoid valve 50 is opened is in response to the pressure sensed by the pressure sensor 31. The pressure sensor 31 senses actual service air pressure directly downstream of the minimum pressure valve 29 and outputs a voltage or other sensor signal proportional to the sensed service air pressure the controller 16. The controller 16 sends a control signal, such as an electrical current, to the proportional solenoid valve 50 in response to, and preferably proportional to, any difference between the target pressure setpoint and the actual service air pressure sensed downstream of the minimum pressure valve 29, as described previously. In some arrangements of either FIG. 1 or FIG. 2, the actual service air pressure may be sensed upstream of the service air ball valve 18. In other arrangements, the actual service air pressure may be sensed in the service air outlet 11 downstream of the service air ball valve 18.

Unloading the air compressor system 2 with the normally closed proportional solenoid valve 50 is generally similar but opposite to the process used with the normally open proportional solenoid valve 23. To unload the air compressor system 2, the normally closed proportional solenoid valve 50 is fully or partially energized to overcome the net forces on the poppet 45 and thereby close the compressor inlet valve 3. With the compressor inlet valve 3 closed, the air compressor system 2 is unloaded as previously described.

The proportional solenoid valve 50 is not capable of blowing down the compressor system 2 in all scenarios, specifically the intentional or unintentional shutdown of the compressor system 2 or parent machine because the proportional solenoid valve 50 defaults to the closed position in its normal state. Therefore, the aforementioned separate blowdown valve 52 is provided to facilitate blowdown. In this example, the blowdown valve 52 is a type of pneumatic piloted unloader valve. The blowdown valve 52 is coupled between the internal system pressure section 46 and the inlet control port 9 in parallel with the normally closed proportional solenoid valve 50. The blowdown valve 52 receives a pilot signal 54 from the compressor inlet pressure section 12. During operation of the air compressor system 2, the compressor inlet pressure section 12 is under a vacuum. A combination of this vacuum and the system pressure to the inlet of the blowdown valve 52 from the internal system pressure section 46 holds an internal valve member (shuttle) within the blowdown valve 52 in a closed position such that the inlet of the blowdown valve 52 is not open to the outlet of the blowdown valve 52. However, when the air compressor 15 is deactivated, for example, shut down or disengaged, such that the compressor rotors are no longer spinning, the pressure in the compressor inlet pressure section 12 begins to normalize with system pressure in the internal system pressure section 46. This positive pressure provides the pilot signal 54 to the blowdown valve 52, which moves the shuttle to fluidly connect the inlet with the outlet to open the blowdown valve 52. This will effectively blow down the air compressor system 2 independent of the normally closed proportional valve 50. System pressure is allowed through the blowdown valve 52 and becomes control pressure in the control pressure section 13 of the compressor inlet housing 6. This control pressure holds the poppet 45 closed while the system depressurizes through the bleed orifice 8 in the control pressure section 13, generally as described previously.

In either scenario of FIG. 1 and FIG. 2, an air storage vessel 55, such as an air tank, may be provided that is operatively fluidly connected between the minimum pressure valve 29 and the service air ball valve 18. Air storage in the air storage vessel 55 may reduce sudden pressure drops due to changes in operator demand. However, the air storage vessel 55 may be omitted, for example, if the application does not require a higher rate of volumetric flow than the air compressor system 2 is capable of at the required application pressure.

Some benefits of air compressor systems encompassing principles disclosed herein may include the ability to enable multiple pressure settings and use only a single valve. For example, a user may set a target pressure at the controller 16 and hold the target pressure depending on output demand. The pressure sensor 31 provides the input for the controller 16. This arrangement may provide for smoother operation under variable load conditions to previously known mobile air compressor systems, and may have fewer wear parts than previously known mobile air compressor systems.

A compressor inlet valve 3 and controller 16 arrangement according to the principles disclosed herein may also be capable of providing benefits for over the road equipment by allowing a tighter tolerance of pressure to be held without an air tank, and/or allowing the modulation of flow/pressure to reduce overall horsepower draw of a mobile utility machine, such as an automobile, truck, etc. This may be particularly helpful for a multifunction machine carried on a mobile platform and with new battery powered systems.

An air compressor system 2 according to the principles disclosed herein may provide additional benefits when incorporated as part of a mobile utility machine, such as an air compressor, with or without a welding machine or other machines, carried on a utility vehicle, such as a truck, and/or adapted to be mobile and used in a temporary field setting without being permanently installed at the location of use. In such a use, the air compressor is typically driven by a single drive motor (serving as the drive 22). The drive motor may be either the primary drive engine for the utility vehicle, or the drive motor may be a utility power engine or motor separate from the primary drive engine of the utility vehicle.

An air compressor system 2 according to the principles disclosed herein may provide additional benefits when incorporated as part of a multi-function mobile utility machine, such as a truck or other utility vehicle, that supports and/or has a single engine that provides drive power for multiple utility tools and/or functionalities, such as welding, jumpstarting, air compressors, and/or AC power. For example, an air compressor system 2 according to the principles disclosed herein may be used in a method of air arc gouging (cutting) that utilizes arc cutting equipment as part of an air compressor-welder system of a mobile utility machine. The method may include providing a manual or automatic logic controller (e.g., such as the controller 16), using the logic controller to select an operating mode for the air compressor-welder system, sensing an air pressure generated by the air compressor system 2, and controlling an amount that the proportional solenoid valve 23 or 50 opens to control flow of supply air into the air compressor 15 in proportional response to the sensed air pressure. The method may be used to control and/or limit and/or be controlled and/or limited by selected welding maximum limits. By utilizing an air compressor system 2 according to the principles disclosed herein, it may be possible to reduce the horsepower load required from a single engine on a multi-function mobile utility machine to allow more than one function to occur at a time while using the machine.

In another particular application, an air compressor system 2 according to the principles disclosed herein may be useful for implementation in a battery-driven air compressor system, in which the air compressor 15 is driven off battery power (rather than an engine) as the drive 22. For example, an air compressor system 2 according to the principles disclosed herein may be used in a method of reducing battery usage from a portable multifunction air compressor (PMAC) system that is part of a mobile utility machine. The method may include sensing an air pressure generated by the air compressor 15 and controlling an amount that the proportional solenoid valve 23 or 50 opens to control flow of supply air into the air compressor 15 in proportional response to the sensed air pressure. The method may include using a logic controller (e.g., such as the controller 16) to manually or automatically select an operating mode of the PMAC system.

In view of the above description according to general and nonlimiting aspects, it can be seen that the use of a proportional solenoid valve 23 or 50 to provide variable control of atmospheric air into, and ultimately out of, a compressor system 2 is disclosed. The proportional solenoid valve 23 or 50 may be used with many different variations and implementations. For example, the proportional solenoid valve 23 or 50 may be used in conjunction with software program logic, may be used with compressor systems in multifunction machines for compressor system efficiency and overall system load management, may be used with compressors systems in mobile utility systems, including but not limited to systems mounted to various mobile service, municipal, utility, and military vehicles, may be used with a bleed orifice 8 sized to pair with compressor systems of capacity up to at least 250 CFM, and/or may be used with compressors in multifunctional machines to manage system load and compressor output.

An air compressor system 2 according to this disclosure may provide compressor output pressure control and/or capacity control inputs and outputs. For example, an air compressor system 2 according to this disclosure may include the pressure sensor 31 to measure service air discharge pressure to provide an input signal to the controller 16 for output to the proportional solenoid valve 23 or 50. An air compressor system 2 according to this disclosure may include the pressure sensor 31 to measure system air pressure as an input to a minimum unload pressure input signal to the controller 16 for output to the proportional solenoid valve 23 or 50. An air compressor system 2 according to this disclosure may include the pressure sensor 31 to measure system air pressure as an input signal to the controller 16 as an indication of compressor load consumption.

An air compressor system 2 according to this disclosure may provide a variety of operational capabilities. As non-limiting examples, the system 2 may provide pulse width modulation control over an electronic proportional solenoid valve 23 or 50 in conjunction with a feedback logarithm, such as proportional integral derivative (PID) control, and/or a method of electronically signaling pneumatic inlet control of a compressor system 2 that can be directly mounted to or remotely mounted from the compressor system 2, and/or a method of maintaining a precise pressure output based on an adjustable electronic control signal, and/or a method of variable capacity control of a compressor system 2 with a fixed compressor input speed, and/or a method of variably unloading a reciprocating compressor system 2, and/or a method for variable unload between stages of a reciprocating compressor system, and/or a method to manipulate the position of reciprocating compressor head unloading valves via a control pressure signal, and/or a method of modulating the compressor inlet and capacity control over a single function mobile compressor system, and/or a method of electronically modulating a specific service air pressure setpoint, for example, when used in conjunction with a controller containing programmed control logic.

As previously noted above, though the foregoing detailed description describes certain aspects of one or more particular embodiments of the invention, alternatives could be adopted by one skilled in the art. For example, the compressor systems 2 and their components could differ in appearance and construction from the embodiments described herein and shown in the drawings, and functions of certain components of the systems 2 could be performed by components of different construction but capable of a similar (though not necessarily equivalent) function. As such, and again as was previously noted, it should be understood that the invention is not necessarily limited to any particular embodiment described herein or illustrated in the drawings.

The invention claimed is:

1. A system for controlling flow of air into an air compressor of an air compressor system that is part of a mobile utility machine, the system comprising:

a proportional solenoid valve configured to control flow of air through a supply air inlet into the air compressor in proportional response to sensed air pressure generated by the air compressor system for improved efficiency in compressor system load requirement; and a controller that generates an electronic control signal proportionally responsive to the sensed air pressure for controlling the proportional solenoid valve;

wherein the controller is configured to generate the electronic control signal to be proportional to a difference between a preselected target pressure set point and the sensed air pressure; and wherein the controller has programmatically adjustable variable ramp up and ramp down logic functions that depend on the measured difference between the sensed air pressure measured by the pressure sensor and the preselected target pressure set point.

2. The system of claim 1, wherein the control signal controls the proportional solenoid valve to an open position that is proportional to the sensed air pressure.

3. The system of claim 1, wherein the proportional solenoid valve partially opens to any of a plurality of partially open positions between a fully open position and a fully closed position in response to the electronic control signal generated by the controller.

4. A controller that generates an electronic control signal proportionally responsive to a sensed air pressure, the controller being operable so that:

the electronic control signal controls a proportional solenoid valve to an open position that is proportional to the sensed air pressure;

the controller receives a pressure signal indicative of the magnitude of the sensed air pressure and generates the electronic control signal for controlling the proportional solenoid valve to open in proportional response to the sensed air pressure;

the controller generates the electronic control signal to be proportional to a difference between a preselected target pressure set point and the sensed air pressure based on programmatically adjustable variable ramp up and ramp down logic functions that depend on the difference between the sensed air pressure and the preselected target pressure set point; and the controller generates the electronic control signal with a range having an upper and lower limit which can be logically manipulated to limit pressure building capacity.

5. The controller of claim 4, wherein the controller receives the sensed air pressure from a pressure sensor.

6. The controller of claim 4, wherein the sensed air pressure is a service air pressure for delivery to a use load.

7. The controller of claim 6, wherein the controller controls flow of supply air into an air compressor of an air compressor system.

8. The controller of claim 7, wherein the supply air is at atmospheric pressure.

9. The controller of claim 4, wherein the proportional solenoid valve controls a supply of system pressure provided to a compressor inlet valve to control an amount of opening of the compressor inlet valve proportional to the sensed air pressure.

10. A method of controlling flow of supply air into an air compressor of an air compressor system that is part of a mobile utility machine, the method comprising:

sensing an air pressure generated by the air compressor system; and controlling an amount of opening of a proportional solenoid valve configured to control flow of supply air into the air compressor in proportional response to the sensed air pressure based on programmatically adjustable variable ramp up and ramp down logic functions that depend on a difference between the sensed air pressure and a preselected target pressure set point.

11. A method of air arc gouging with an air compressor-welder system that is part of a mobile utility machine, the air compressor welder system including an air compressor, a welder, a logic controller, and a proportional solenoid valve configured to control flow of supply air into the air compressor, the method comprising:

using the logic controller to select an operating mode for the air compressor-welder system;

sensing an air pressure generated by the air compressor welding system; and controlling an amount of opening of the proportional solenoid valve in proportional response to the sensed air pressure based on programmatically adjustable variable ramp up and ramp down logic functions that depend on a difference between the sensed air pressure and a preselected target pressure set point.

12. The method of claim 11, wherein the step of selecting a mode is done manually.

13. The method of claim 11, wherein the step of selecting a mode is done automatically.

14. The method of claim 11, further comprising limiting the air arc gouging by selecting a welding maximum limit.

15. A method of reducing battery usage from a portable multifunction air compressor system that is part of a mobile utility machine, the method comprising:

using a logic controller to select an operating mode of the portable multifunction air compressor system;

sensing an air pressure generated by an air compressor of the portable multifunction air compressor system; and controlling an amount of opening of a proportional solenoid valve configured to control flow of supply air into the air compressor in proportional response to the sensed air pressure based on programmatically adjustable variable ramp up and ramp down logic functions that depend on a difference between the sensed air pressure and a preselected target pressure set point.

16. The method of claim 15, wherein the step of selecting a mode is done manually.

17. The method of claim 15, wherein the step of selecting a mode is done automatically.

* * * * *